United States Patent
Heavirland et al.

[19]

[11] Patent Number: 5,889,648
[45] Date of Patent: Mar. 30, 1999

[54] SEISMIC CABINET

[75] Inventors: Robert Alan Heavirland, North Branch; Darrel W. Spiczka, Princeton; Jerome F. Kemp, Long Lake, all of Minn.

[73] Assignee: Storage Technology Corporation, Louisville, Colo.

[21] Appl. No.: 900,248

[22] Filed: Jul. 25, 1997

[51] Int. Cl.$^6$ .................................................. H02B 1/00
[52] U.S. Cl. .......................... 361/600; 361/601; 361/602; 361/614; 361/636; 312/223.1; 312/223.2; 312/223.3; 174/50; 174/52.1; 211/194
[58] Field of Search .................. 361/600, 729, 361/752, 816, 818; 312/223.1, 223.2; 211/189, 191, 193, 194, 135; 174/50, 52.1

[56] References Cited

U.S. PATENT DOCUMENTS

| 5,165,770 | 11/1992 | Hahn | 312/265.4 |
| 5,441,337 | 8/1995 | Mazura et al. | 312/265.5 |
| 5,536,079 | 7/1996 | Kostic | 312/265.3 |
| 5,574,251 | 11/1996 | Sevier | 174/50 |

*Primary Examiner*—Leo P. Picard
*Assistant Examiner*—Boris L. Chervinsky
*Attorney, Agent, or Firm*—Brooks & Kushman P.C.

[57] ABSTRACT

A seismic cabinet for containing electronic equipment. The cabinet includes a support bracket for attachment to the electronic equipment. Rails inside the cabinet allow attachment of the equipment and associated fanout panels to the cabinet. A removable screenlike top portion allows cable access.

4 Claims, 5 Drawing Sheets

SEISMIC CABINET

BACKGROUND OF THE INVENTION

1. Field of the Invention

The invention relates to the field of cabinet structures. More particularly, the invention relates to the field of cabinets for particular electrical devices or components. In still greater particularity, the invention relates to a cabinet for housing computer related equipment. By way of further characterization, but not by way of limitation thereto, the invention relates to a cabinet which will withstand seismic shock in accordance with certain industry criteria.

2. Description of the Related Art

Equipment used in the telephone and computer industries can be somewhat delicate and subject to damage when exposed to certain external forces. For example, during shipping, the equipment may be subject to certain forces when loaded or unloaded or during transport. Once installed, the equipment may be subject to jostling or to certain environmental forces such as earthquakes, hurricanes etc. which could damage the equipment contained therein if not protected.

In the computer and telephone industries in particular, damage or destruction of certain equipment would result in loss of data and/or voice communications. The telephone industry has established certain minimum seismic requirements which equipment must be able to withstand in order to be seismically rated. Bell Communications Research (Bellcore) has established seismic testing requirements which are published as Bellcore Generic Requirements GR-63-CORE, Issue 1, October 1995 along with the attached Wyle Laboratories Test Procedure 543/1970/DB.

The telephone industry requires that equipment which will be put into service in critical, high risk areas or applications must meet the above noted Bellcore seismic requirements. For example, equipment which will be used in what is referred to as Zone 4 applications must be seismic rated. Zone 4 includes high risk earthquake areas such as Southern California and Japan. One type of equipment which is widely used in telephone applications is an Enterprise Routing Switch (ERS) which is sold by the Northern Telecom Company of Canada under the trademark PASSPORT. These ERS switches are usually provided to a customer in a cabinet which can contain one or more (typically two) ERS units. In order for this type of equipment to be sold for telecommunications applications in Zone 4, for example, the cabinet containing the ERS equipment must meet the Bellcore seismic requirements.

The ERS equipment and similar types of electronic equipment include a large number of electronic components contained in a sheet metal housing which, in and of itself, does not meet the Bellcore requirements. The ERS sheet metal housing usually includes pieces of relatively thin sheet metal held together by sheet metal screws and rivets. While providing sufficient support for the electronic components in many applications, these housings are inherently flexible and do not meet Bellcore seismic requirements for high risk applications. During rough handling or seismic stress it is possible for the rear panel to break away from the housing and the circuit boards/cards to become dislodged from the unit.

SUMMARY OF THE INVENTION

The invention is a seismic cabinet for supporting and containing electronic equipment which will meet industry seismic testing requirements. A support panel is attached to the electronic equipment and supports the equipment in the cabinet. The electronic equipment and the support panel are attachable to rails mounted on the sides of the cabinet. Front and rear doors allow access to the equipment contained therein.

Additional rails may be used to mount fanout panels adjacent the rear of the cabinet. The top portion of the cabinet may be comprised of one or more removable screen portions for ventilation and to allow cable access.

DESCRIPTION OF THE PREFERRED EMBODIMENT

Figure 1:
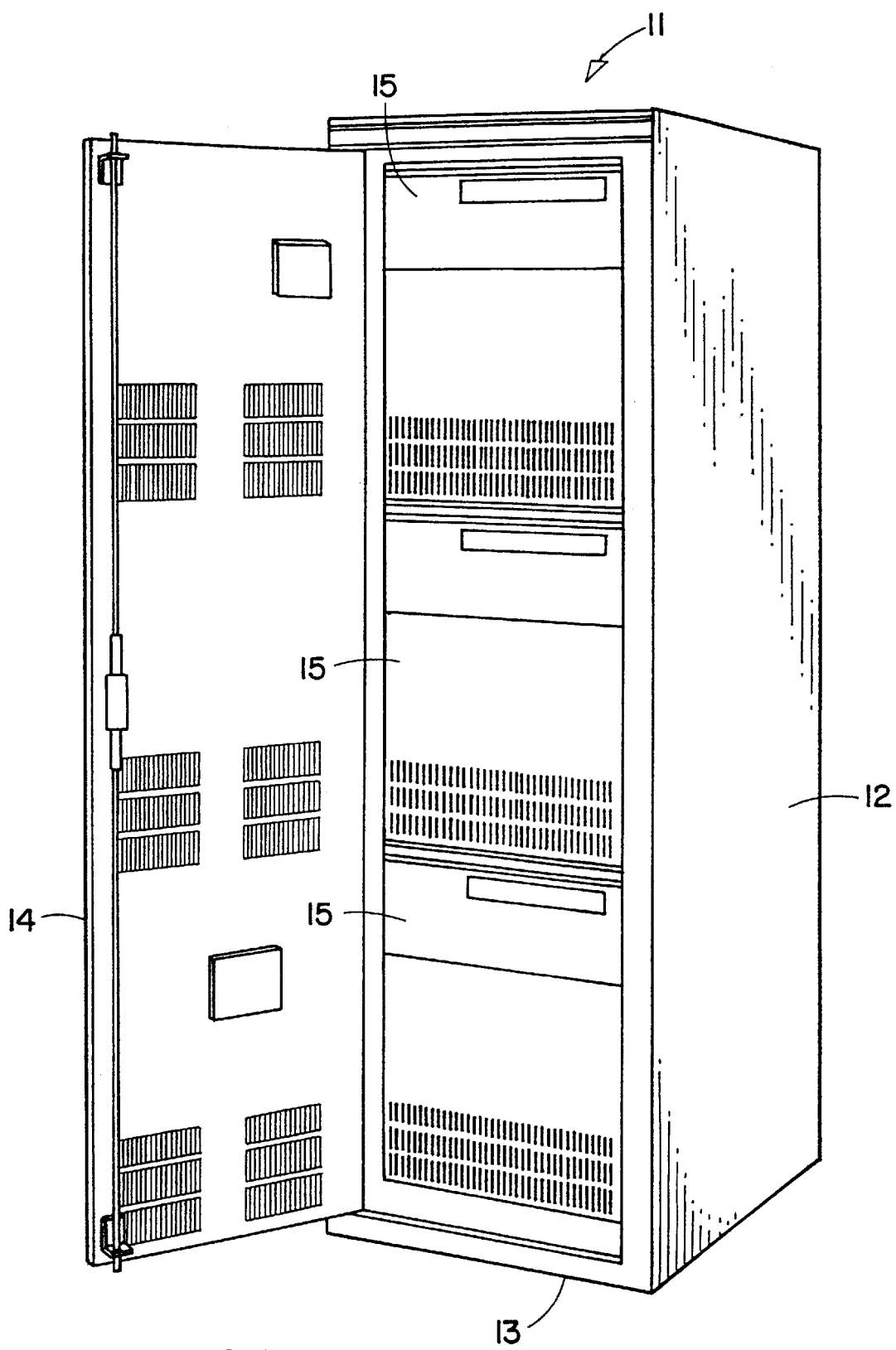
FIG. 1 is a front perspective view of the seismic cabinet with the front door open.

Referring now to the drawings wherein like reference numerals denote like structure throughout each of the various figures, FIG. 1 is a front view of a seismic cabinet 11. A side panel 12 and a bottom panel 13 are substantially parallel to an opposite side panel and a top panel respectively. A front access door 14 is shown open to reveal electronic equipment 15 contained within cabinet 11.

Figure 2:
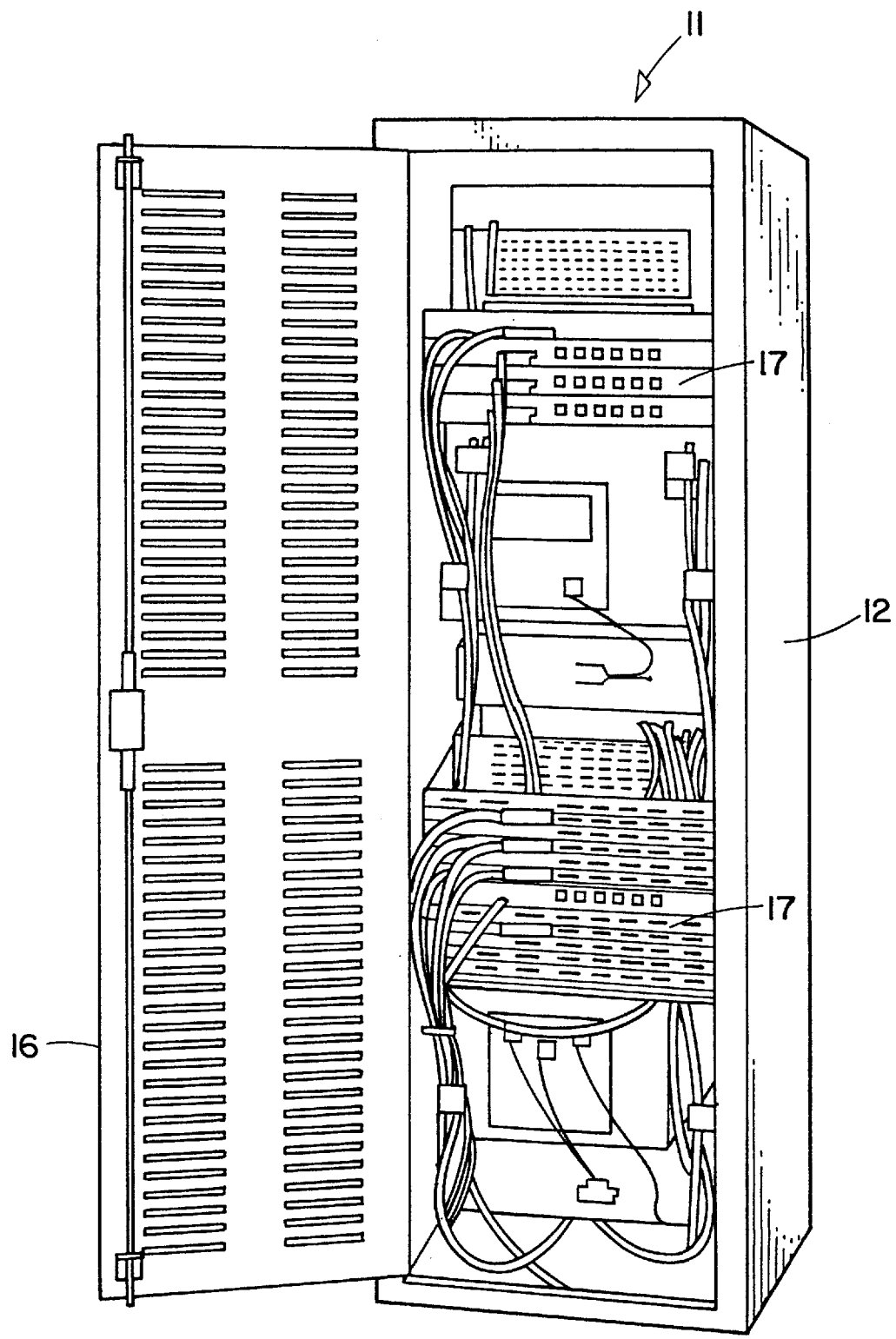
FIG. 2 is a rear perspective view of the seismic cabinet with the rear door open.
Figure 3:
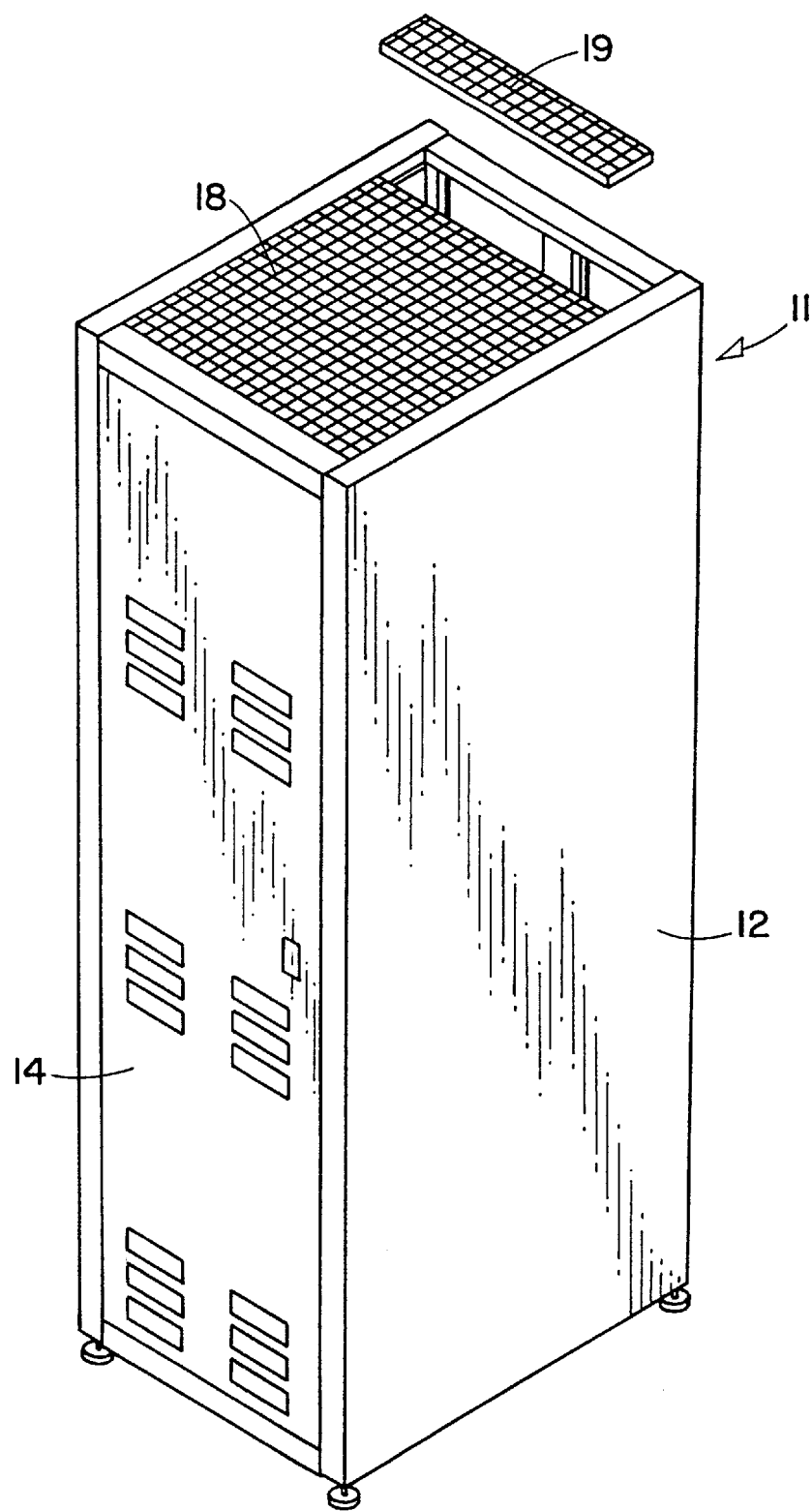
FIG. 3 is front perspective view of the seismic cabinet illustrating the multiple screen top portions.

Referring to FIG. 2, a rear perspective view of cabinet 11 with rear access door 16 open reveals electronic equipment 15 and fanout panels 17 contained within cabinet 11. A side panel 12 is shown which is substantially parallel to side panel 12 shown in FIG. 1. Referring to FIG. 3, a front perspective view of cabinet 11 with front access door 14 closed illustrates top portions 18 and 19. Top portions 18 and 19 are preferably made in an open screen-like configuration to allow ventilation to the inside of cabinet 11. While top portions 18 and 19 could be made in one piece, it is advantageous to have two top portions which are removable and reversible to allow cable access from the top front or top rear of the cabinet. That is, smaller top portion 19 may be positioned adjacent the front of cabinet 11 or the rear as shown in FIG. 3 to allow cable access to the inside of cabinet 11. Referring to FIGS. 1, 2, and 3, the top and bottom panels 18, 19 and 13, substantially perpendicularly intersecting with side panels 12 and front and rear access doors 14 and 16 define a substantially rectangular boxlike enclosure for electronic equipment 15.

Figure 4:
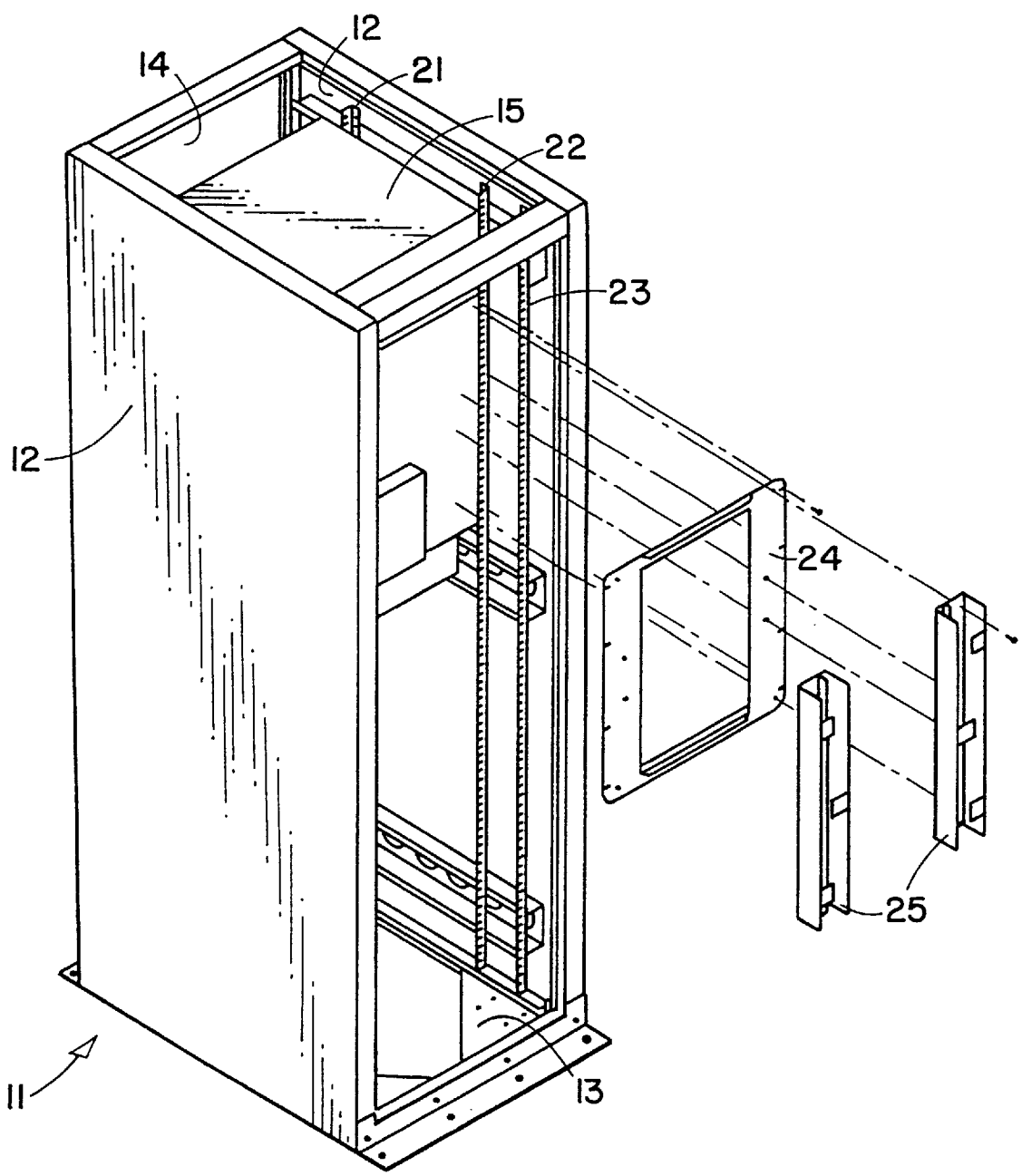
FIG. 4 is a rear perspective view with the rear door removed illustrating the attachment of the support bracket.

Referring to FIG. 4, a rear perspective view of cabinet 11 is shown with top portions and rear access door removed. Electronic equipment 15 is shown in cabinet 11. A first rail 21 is mounted on side panel 12 in proximity to front access door 14. Electronic equipment 15 is removably attached to rail 21. A second rail 22 and a third rail 23 are also attached to side portion 12 in proximity to rear access door 16 (removed). The opposite side panel 12 also includes corresponding first, second, and third rails. A support bracket 24 is shown and is attachable to electronic equipment 15 by screws or other suitable means. A pair of cable brackets 25 may be removed from electronic equipment 15 and then reattached with support bracket therebetween. It should be expressly understood however, that cable brackets 25 may be removed entirely and form no part of the present invention.

Support bracket 24, after attachment to electronic equipment 15, is attached to second rail 22. Electronic equipment 15 is thus attached to cabinet 11 and contained between rails 21 and 22. Support bracket 24 absorbs shock and vibration induced by seismic forces and thus maintains the integrity of the chassis of electronic equipment 15 keeping the unit operational. Third rail 23 is used to mount fanout panels 17 (FIG. 2). Fanout panels 17, as is known in the art, allow plug in of the computer cabling to the fanout panels which, in turn, eletromagnetically connect to electronic equipment 15. Prior art cabinets do not provide for the inclusion of fanout panels in the one cabinet containing multiple units of electronic equipment which otherwise fill cabinet 11 from top to bottom.

Figure 5:
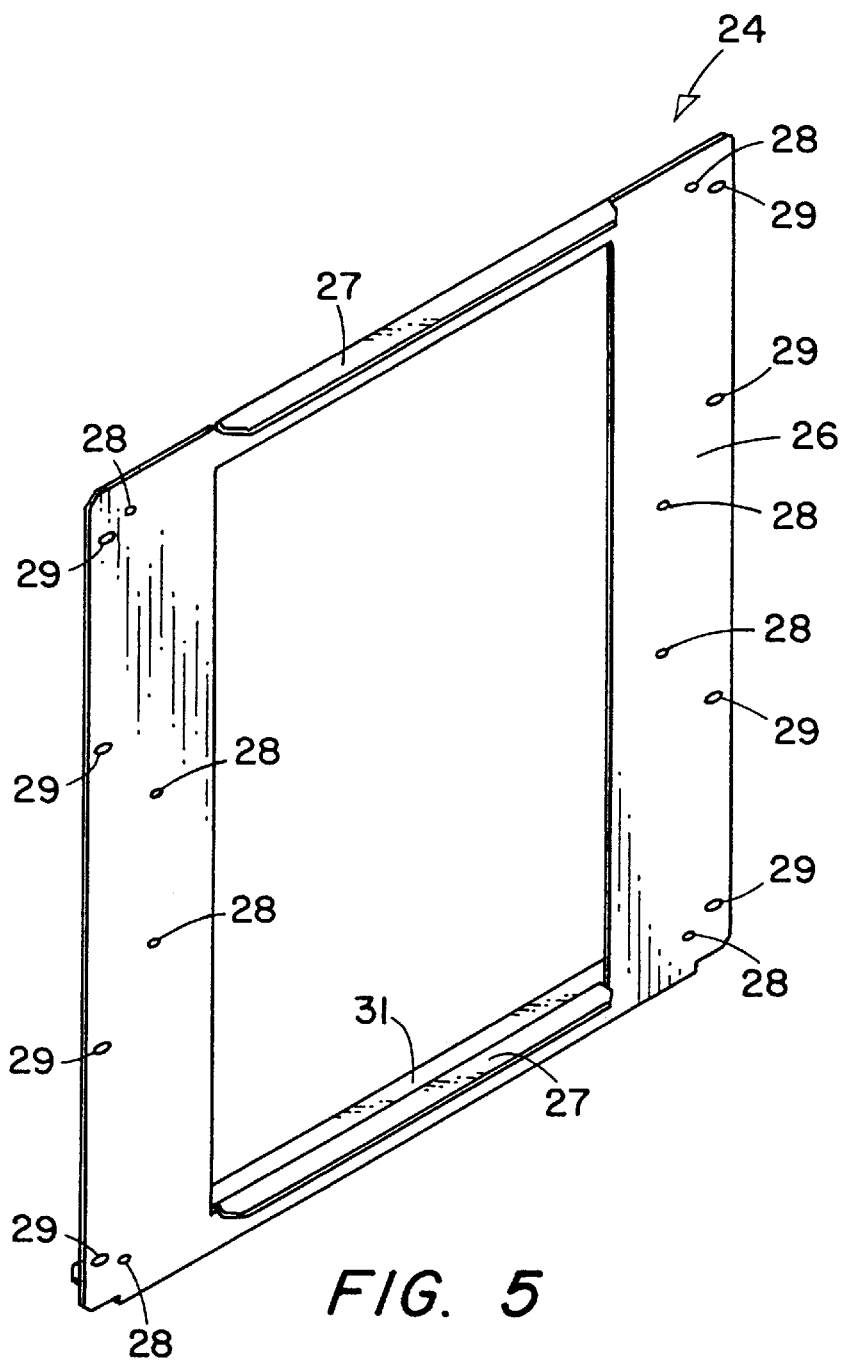
FIG. 5 is a perspective view of the support bracket.
Figure 6:
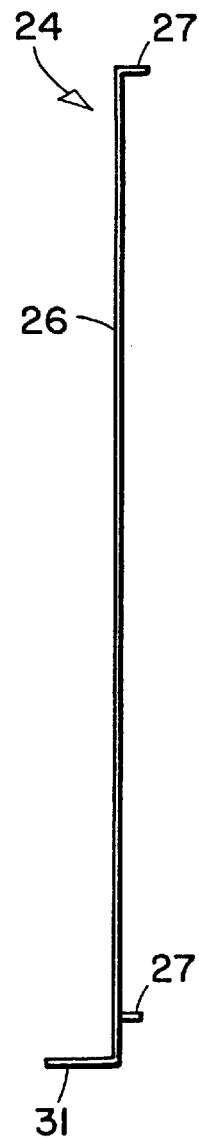
FIG. 6 is a side view of the support bracket.

Referring to FIG. 5, a rear perspective view of support bracket 24 is shown. A substantially flat rectangular sheet 26 is preferably made of 13 gauge steel for rigidity and strength. It should be expressly understood that aluminum or other suitable material of suitable thickness and strength may be used to construct bracket 24. Flanges 27 at the top and bottom of bracket 24 provide added strength. A plurality of holes 28 in bracket 24 allow attachment of bracket 24 to electronic equipment by means of screws or other means as is known in the art. Referring to FIGS. 4 and 5, a plurality of holes 29 allow attachment of bracket 24 to second rail 22 by means of screws or other means as is known in the art. A lip portion 31 on the opposite side of bracket 24 from flanges 27 extends under at least a portion of electronic equipment 15 when support bracket 24 is attached to equipment 15. Lip portion 31 provides additional support for electronic equipment 15 when bracket 24 is mounted to the back of equipment 15. Referring to FIG. 6, a side view of support bracket 24 is shown illustrating sheet 26, flanges 27, and lip portion 31.

Because of the support provided by support bracket 24 and cabinet 11 when electronic equipment 15 is mounted therein, the otherwise inherently flexible chassis of electronic equipment 15 is able to withstand stress from vibration and shock. Thus, equipment such as the enterprise routing switch may be utilized in seismic areas such as zone 4 which would not otherwise be suitable.

While the invention has been disclosed with respect to a preferred embodiment, it should not be limited thereto as modifications may be made which are within the full intended scope of the invention as defined by the appended claims. For example, the choice of materials may be modified as long as the chosen materials allow the cabinet structure to pass the Bellcore seismic requirements. Similarly, while attachment of the various components is done by sheet metal screws, any suitable attachment means may be used.

What is claimed is:

1. A seismic cabinet for containing electronic equipment comprising:

a housing including two side panels substantially parallel to one another, a front and a rear access door substantially parallel to one another and substantially perpendicular to said side panels, and a top and bottom panel substantially parallel to one another and substantially perpendicular and connected to said side panels, said housing substantially defining a rectangular supporting structure;

a first and second rail attached to each side panel, said first rail mounted in proximity to said front access door and said second rail mounted in proximity to said rear access door, said first and second rails extending along at least a portion of each said side panel substantially perpendicular to said top panel and to said bottom panel;

a support bracket, connectable to said electronic equipment and to said second rails, said support bracket including a lip portion extending beneath said electronic equipment; and whereby said electronic equipment is connectable to said first rails so as to be substantially contained between said first and second rails on each said side panel.

2. A seismic cabinet according to claim 1 further including two third rails one on each said side panel mounted in proximity to said rear access door, said third rails extending along at least a portion of each said side panel substantially perpendicular to said top panel and to said bottom panel.

3. A seismic cabinet according to claim 2 wherein said third rail is adapted to receive one or more fanout panels.

4. A seismic cabinet according to claim 1 wherein said top panel includes two removable and reversible screen portions.

\* \* \* \* \*